United States Patent [19]

Mantz

[11] Patent Number: 5,285,500
[45] Date of Patent: Feb. 8, 1994

[54] CAR AMPLIFIER WITH OPTIONAL PLUG-IN MODULES

[75] Inventor: Stephen Mantz, Northridge, Calif.
[73] Assignee: Audio Products, Inc., Dothan, Ala.
[21] Appl. No.: 867,935
[22] Filed: Apr. 13, 1992
[51] Int. Cl.⁵ .................................................. H04B 1/00
[52] U.S. Cl. ........................................ 381/86; 351/120; 455/346; 455/348
[58] Field of Search ............... 455/345, 346, 347, 348; 381/86, 96, 28, 120

[56] References Cited

U.S. PATENT DOCUMENTS

| | | | |
|---|---|---|---|
| Re. 25,317 | 1/1963 | McCoy | 330/66 |
| 2,519,415 | 8/1950 | Thomas | 250/14 |
| 3,184,911 | 5/1965 | Canale et al. | 58/44 |
| 3,466,564 | 9/1969 | Weischedel | 330/66 |
| 3,553,600 | 1/1971 | Bachnick et al. | 330/66 |
| 3,619,776 | 11/1971 | Kinninger | 324/115 |
| 3,622,700 | 11/1971 | Goetz | 178/7.9 |
| 3,708,618 | 1/1973 | Hofmeister et al. | 178/7.9 |
| 3,970,782 | 7/1976 | Fenne | 178/7.9 |
| 4,000,475 | 12/1976 | Oiwa | 330/66 |
| 4,131,851 | 12/1978 | Martiny et al. | 325/355 |
| 4,248,069 | 2/1981 | Burbank | 455/345 |
| 4,513,405 | 4/1985 | Hills | 455/347 |
| 4,532,162 | 7/1985 | Neece | 455/347 |
| 4,644,289 | 2/1987 | Kennedy et al. | 330/145 |
| 4,807,292 | 2/1989 | Sorscher | 455/346 |
| 5,014,320 | 5/1991 | Nagi et al. | 381/96 |

FOREIGN PATENT DOCUMENTS 1148609 5/1963 Fed. Rep. of Germany ...... 455/346

Primary Examiner—Forester W. Isen
Attorney, Agent, or Firm—Shlesinger, Arkwright & Garvey

[57] ABSTRACT

An amplifier unit, adapted for use in a vehicle and for enhancing output signals of the vehicle sound system includes a housing provided with an opening for accessing the interior of the housing, an audio signal input attached to the housing, electric circuitry mounted within the housing which forms an apprible amplifier with basic operating characteristics for amplifying received signals, a connection device for optionally receiving module units having additional circuitry within the housing and for electrically connecting the additional circuitry with the basic electric circuitry to modify the basic operating characteristics of the amplifier, and an amplified signal output. This amplifier unit enables a consumer to buy a basic operable amplifier to which he can add special functions enabling him to build a different amplifier from his basic model.

16 Claims, 3 Drawing Sheets

CAR AMPLIFIER WITH OPTIONAL PLUG-IN MODULES

FIELD OF THE INVENTION

The present invention relates generally to an electronic amplifier system with optional plug-in circuitry modules and, more particularly, to a power amplifier having basic operating characteristics and an opening for optionally receiving circuitry module units for selectively varying the basic operating characteristics of the amplifier to produce a different amplifier unit for modifying inputted audio signals.

BACKGROUND OF THE INVENTION

It is known in the art to install a performance amplifier within a vehicle, such as an automobile, in order to modify audio frequency signals generated by the vehicle's sound system. With such known amplifiers, audiophiles can continue listening to high-fidelity sound reproductions of music and speech, even while traveling in their automobiles. These amplifiers are conventionally mounted in the trunk or under one of the front seats of the automobile.

Conventional amplifiers adapted for installation in a vehicle may have external adjustment controls so that a listener can fine tune, for example, the audio frequency response of the amplifier to suit his desires, the acoustic environment in the vehicle, and/or any deficiencies in equipment or recordings. These external controls extend through a face of the amplifier's housing and are electrically connected to the main circuitry of the amplifier, but do not change the basic operating characteristics of the amplifier. That is, a listener can only modulate the audio signals within the basic operating characteristics of the amplifier and cannot achieve a totally different sound unless a new amplifier with different operating characteristics is installed.

While amplifier arrangements employing externally mounted components for establishing operating characteristics of an amplifier are known, the applicant is not aware of such an arrangement being adapted for use in a vehicle. U.S. Pat. No. 3,466,564 to Weischedel discloses an amplifier unit having the above construction. However, such amplifier units are inoperable without an external circuit board being connected thereto. Further, such external arrangements are not practical when units are to be mounted within an open area in a vehicle which may be moving thereby exposing the external circuitry to shifting articles.

In order to improve the aesthetics of known external link-up units, plug-in circuitry units have been developed, for example, in the measuring equipment field which house the circuitry components in a single unit and can slide into a recess in the main housing of the device. Such equipment includes a common housing which can receive one of a plurality of function modules. A multifunction device of this type is described in U.S. Pat. No. 3,619,776 to Kinninger. U.S. Pat. No. 4,131,851 to Martiny et al. discloses a radio signal receiver with plug-in modules. However, both these instruments are incomplete without a module unit which determines the function of the instrument.

In particular, the receiver of Martiny et al. includes a housing with a sealed recess in which a plug-in module must be inserted to link the various circuitry stages of the receiver in the proper sequence to produce a coherent receiver. A variable power amplifier for musical instruments having an opening in its housing for receiving a plurality of pluggable signal processing modules is described in U.S. Pat. No. 4,644,289 to Kennedy et al. However, at least two pluggable signal processing modules need to be inserted into one of several electric terminals to electrically connect first and second electrical signal processing channels of the amplifier's circuitry.

Further, a protective cover which closes the opening through which two of Kennedy's modules are inserted is removed when the device is in use. Accordingly, the electrical circuitry of Kennedy's power amplifier is exposed once mounted for use and is not practical since the electric circuitry is not protected from dust, etc. Thus, with conventional amplifier arrangements, a consumer must purchase the required plug-in units to complete the circuitry of the basic amplifier and still may have problems due to circuitry damage (requiring further expense) since the modules units are not built into the device.

While the above-described conventional plug-in module units may overcome aesthetic disadvantages associated with externally mounted circuitry modules, the circuitry (if any) within the main housing of the device does not produce an operable device. As a result, several functional disadvantages are associated with these known devices in that the additional modifying circuitry is produced as a part of the basic amplifier circuitry, but is an external unit to the basic amplifier. Thus, a consumer is required to purchase an expensive device which is not operable along with separate, external units which determine its function. Further, these external circuits are not securely held within the device and thus can be damage subjecting a consumer to more expense just to operate his basic amplifier.

Therefore, it can be seen that there is a need for an amplifier unit having basic operating characteristics which can be inexpensively modified by a consumer to create a different amplifier unit and has a sturdy cover for protecting its circuitry.

OBJECTS AND SUMMARY OF THE INVENTION

A principle object of the present invention is to provide an amplifier unit, adapted for use in a vehicle having a sound system, in which the basic amplifier unit circuitry can be changed inexpensively by a consumer thereby enabling the basic operating characteristics of the amplifier unit to be modified to suit the consumer's desire.

Another object of the present invention is to provide a car amplifier unit with means for optionally receiving circuitry modules which can provide a wide variety of tonals at the output of the car stereo system. It is a feature of this amplifier unit that a module unit is not required to activate the amplifier unit or to enhance inputted sound signals.

It is a further object of the present invention to provide each optional circuitry module with its own operating controls so that a consumer can fine tune, for example, a specific frequency shaping network of the optional circuitry to reach a desired sound. Accordingly, each optional module unit, when inserted within the amplifier housing and electrically connected to the basic circuitry of the amplifier unit, forms a different amplifier unit which can be further modulated by its own operating controls.

Yet another object is to provide consumers with a normal 2 or 4 channel amplifier that can be transformed into a different amplifier unit which can perform a special function at a fraction of the cost of the basic amplifier unit.

The above objects are achieved by the amplifier unit according to the present invention which includes a housing with an opening for accessing the interior of that housing, circuitry means mounting within the housing which forms an operable amplifier with basic operating characteristics for amplifying received signals, connection means for optionally receiving module units having additional circuitry within the housing and for electrically connecting the additional circuitry with the amplifier circuitry means to modify the basic operating characteristics of the circuitry means, and means for outputting the amplified signal.

A feature of the above invention is that the amplifier includes means for automatically switching from the basic operating characteristics of the circuitry means to a modified operating characteristic by inserting a module unit through the opening and into electrical connection with the amplifier circuitry means.

It is a feature of the invention to provide any alteration to a basic musical waveform through the use of one of these module units.

Another feature of the above invention is that the opening is provided with guide means which assists the consumer in inserting an optional module unit through the opening.

It is yet another feature of the invention to provide an amplifier unit with an opening for optionally receiving circuitry module units within the unit housing which is perpendicular to the housing mounting surface so that a consumer can easily slide the module circuitry into electrical connection with the basic circuitry of the amplifier unit.

A further feature of the invention is an external racking system which enables more than one module unit to be electrically connected to the basic amplifier circuitry. Thus, the external racking system provides a basic amplifier unit or an amplifier unit modified with one module unit with several additional functions at a fraction of the cost of a separate amplifier with all those functions.

BRIEF DESCRIPTION OF THE DRAWINGS

Other objects, features and advantages of the invention and a better understanding of its construction and operation will come apparent from the following description, taken in conjunction with the accompanying drawings in which.

DESCRIPTION OF THE PREFERRED EMBODIMENT

Figure 1:
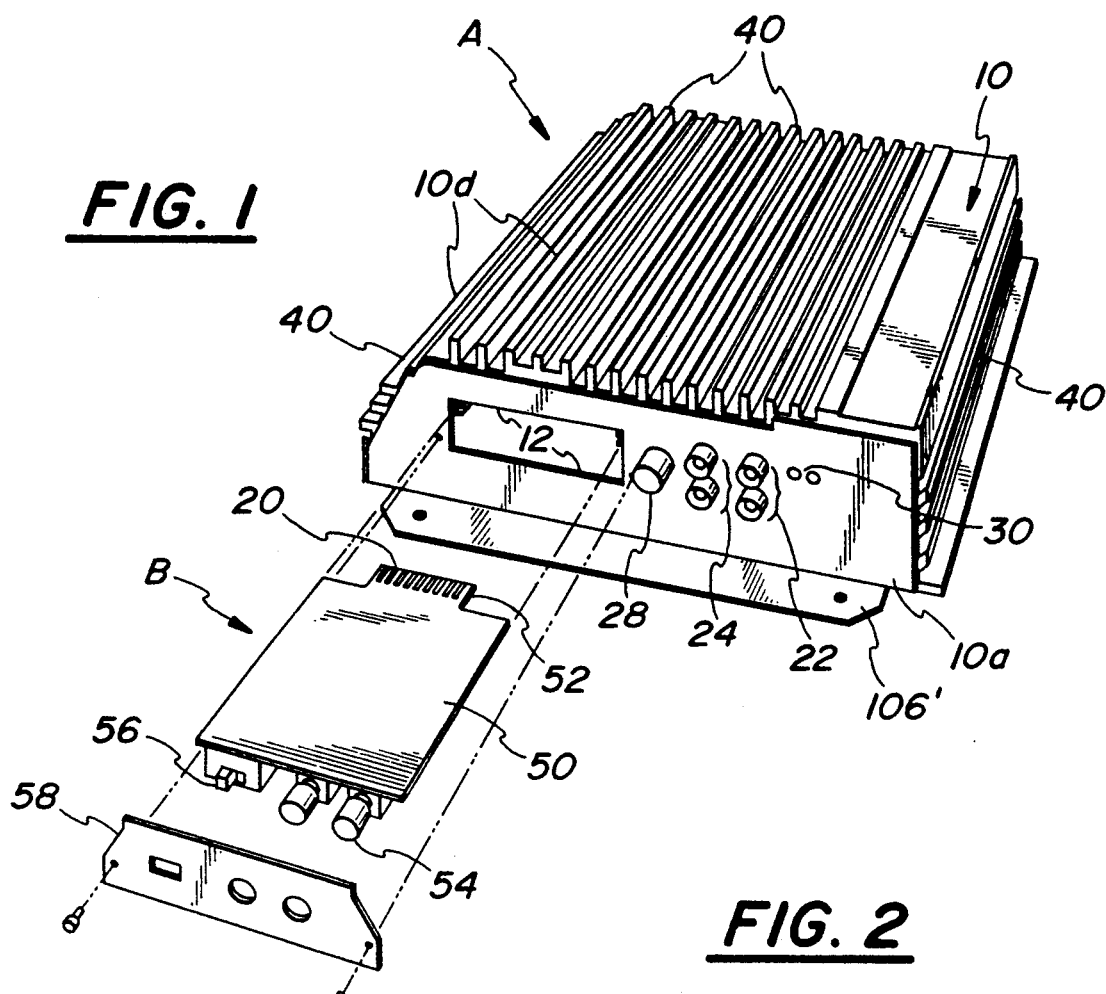
FIG. 1 is an exploded, perspective view of an amplifier unit according to the invention with an optional module unit.

The amplifier unit A of the present invention (see, in general FIG. 1) is adapted for use in a vehicle having a sound system in order in enhance output signals of the vehicle sound system taking into respect the acoustic qualities of the vehicle sound chamber. Amplifier unit A includes a housing 10 provided with an elongated opening 12 for accessing the interior 14 of housing 10, electric circuitry (omitted for clarity) mounted within housing 10 forming an operable amplifier with basic operating characteristics, and a multiple contact connector 16 in electrical connection with the electric circuitry mounted within housing 10 and adapted for receiving electrical terminals 20 of an optional circuitry module unit B to modify the basic operating characteristics of amplifier unit A. In addition, several input/output sockets 22, 24 can be mounted adjacent elongated opening 12 for receiving signals and outputting signals sent through the electric circuitry of amplifier A.

AMPLIFIER UNIT STRUCTURE

Audio signals output from a car radio system, for example, can be received by amplifier unit A by connecting radio system outputs (source) to at least two of the input/output sockets 22, 24 disposed on a front surface 10a of housing 10. This (signal source) connection depends upon the mode (e.g., stereo or mono) of audio signals and can be achieved via cables as is known in the art.

For example, left and right stereo outputs of a conventional 2 channel sound system can be hooked up via cables (not shown) to respective ones of sockets 22. No output signal of amplifier unit A is available through sockets 24, unless an optional module unit B is plugged into the electric circuitry of amplifier unit. Thus, sockets 24 are available for connection with other options.

Housing 10 which may be rectangular and boxlike in shape includes front surface 10a, a bottom surface 10b, a back surface 10c, and a top 10d. Front and back surfaces 10a,c are parallel with one another and substantially perpendicular to bottom surface 10b. Bottom surface 10b may be flat and smooth to provide a level surface for mounting amplifier unit A in a suitable location in a vehicle. A portion 10b' of bottom surface 10b extends beyond front surface 10a and includes holes for receiving fasteners therethrough. Preferably, amplifier unit A can be mounted in the trunk or under one of the front seats of the vehicle. In addition, bottom surface 10b may be removably attached to housing 10 to access interior 14 and the entire electric circuitry forming the operating characteristics of amplifier unit A.

Except for the electrical contact points associated with multiple contact connector 18, the electric circuitry of the amplifier unit A and additional circuitry of module unit B is of no interest in describing the invention. One of ordinary skill in electronics and sound systems would be capable of designing the appropriate circuits for amplifier unit A and a plurality of module units B in view of the above description.

In a preferred embodiment, the electric circuitry (not shown) which forms an operable amplifier with basic operating characteristics is mounted on a circuit board 26 which is secured via conventional means to the inside of top 10d of housing 10.

Thus, circuit board 26 can be installed in parallel with a top surface and bottom surface 10b of housing 10. When installed, the electric circuitry which may include resistors, capacitors, transistors and other components extends toward bottom surface 10b.

Also attached to circuit board 26 are guide members 27 which receive sides of a module unit B and guide the insertion of the optional module unit through elongated opening 12 and into multiple contact connector 16. Instead of being mounted on circuit board 26, guide members 27 can be attached elsewhere within housing 10 but should be positioned between and in alignment with opening 12 and multiple contact connector 16.

Figure 3A:
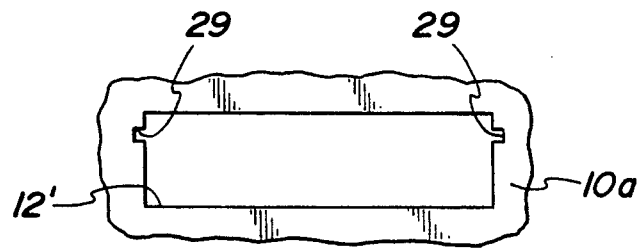
FIG. 3A illustrates a modified opening of an amplifier unit according to the invention.
Figure 3B:
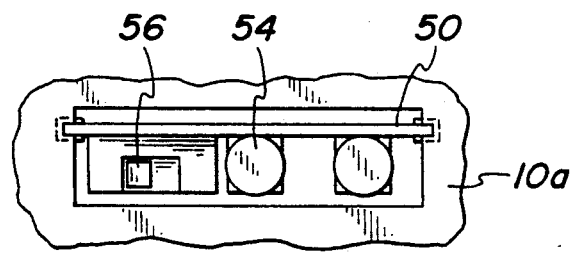
FIG. 3B illustrates the inserted position of an optional module unit in the modified opening of FIG. 3A.

FIG. 3A illustrates another embodiment of opening 12 which includes guide grooves 29 which are formed in front surface 10a adjacent sides of opening 12'. When a module unit B is inserted within opening 12', the longer sides of circuit board 50 are first inserted within grooves 29 and then into the channels of guide members 27. Thus, opening 12' is narrower in this embodiment.

Front surface 10a of housing 10 defines elongated opening 12. The geometrical dimensions of elongated opening 12 may vary depending upon the shape and size of an optional module unit B which is designed to be inserted therethrough. Input/output sockets 22, 24 are in electrical connection with and extend from circuit board 26 located interior to housing 10 through appropriate openings in front surface 10a. Likewise, an external basic circuit adjustment control 28 for modulating signals may extend from circuit board 26 through front surface 10a, as may indicator lights 30.

Circuit adjustment control 28 may be used to adjust the volume, for example of the amplifier audio signals; and indicator lights 30 enable a user to quickly see if the power is on or if the protected circuitry is operating, for example.

Figure 2:
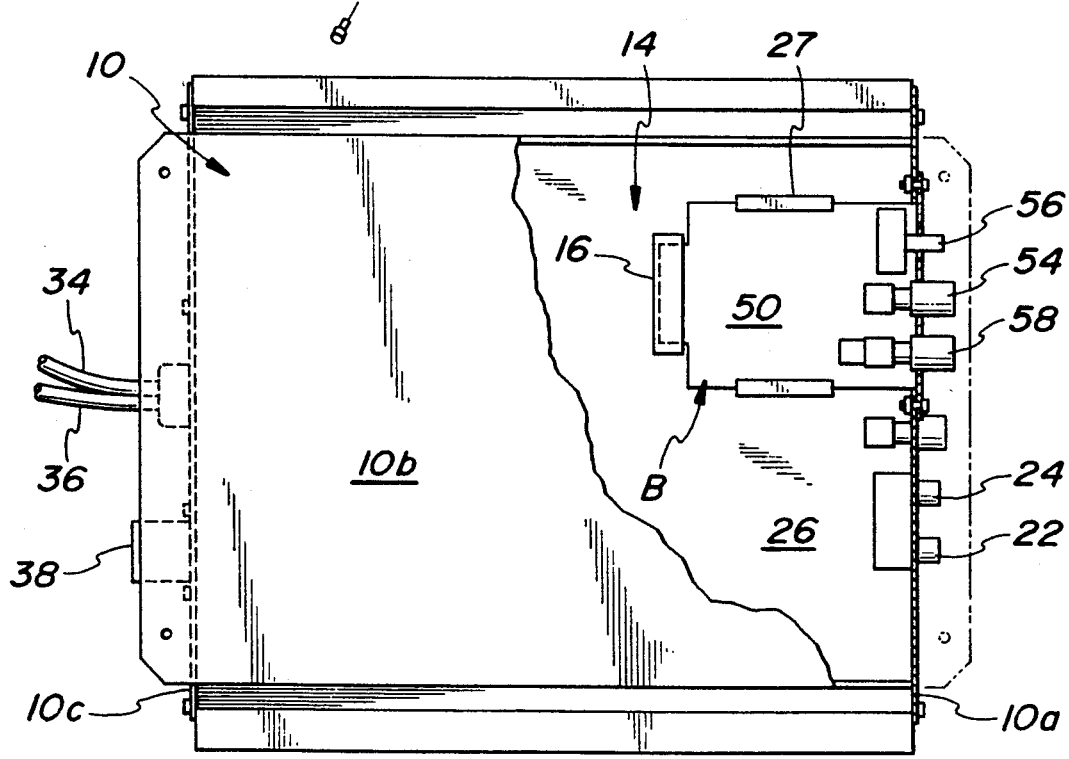
FIG. 2 is a bottom view of an amplifier unit according to the invention with a portion of its bottom surface broken away showing the inserted position of the module unit in electrical connection with amplifier circuitry.

As can be seen in FIG. 2, cables 34, 36 extend through back wall 10c for supplying power to the basic electric circuitry of amplifier unit A. Heavy duty wire is preferably used for cables 34, 36 so that they can be respectively connected to the battery of a vehicle and its chassis (a ground) to draw power. In addition, an output terminal 38 is disposed on back surface 10c for receiving a plurality of amplified output signals from the electric circuitry mounted on printed circuit board 26.

According to the invention, audio signals input through sockets 22, 24 are automatically received by the basic electric circuitry mounted on circuit board 26 which amplifies the signal changing, for example, its frequency response according to the basic operating characteristics of its circuit. The amplified audio signals are then outputted through output terminal 38. A plurality of jacks are mounted in output terminal 38 so that each amplified output signal can be connected to the appropriate speakers of the vehicle sound system. As a result, the amplified audio signals (e.g., a musical selection) can be transferred into one, two, three or four speakers.

In a preferred embodiment, the top and side surfaces (collectively designated by reference numeral 10d) may include a plurality of vanes 40 which extend outwardly from the respective surfaces of housing 10. Vanes 40 can serve as a heat sink for heat generated by the amplifier unit A and thus providing a cooling effect on the energized circuitry. Preferably, the top 10d of housing 10 would be of one-piece construction formed in the general shape of a U. This U-shaped one-piece construction including the plurality of vanes 40 could be manufactured by a conventional extrusion process.

The U-shaped top 10d can be made out of a hard plastic while the front and back and bottom surfaces are made of metal. The front and back surfaces 10a, c are connected via conventional fasteners to the sides of top 10d while the bottom can be held within slots formed in the bottom edges of top 10d.

Figure 4A:
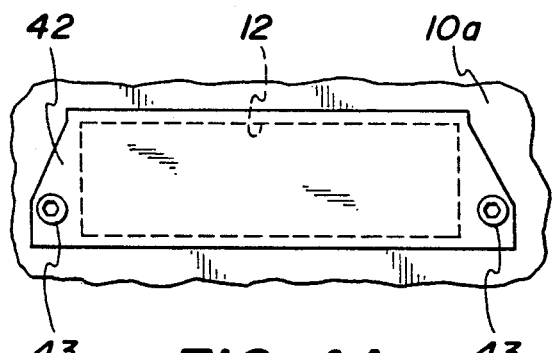
FIG. 4A, 4B, 4C and 4D illustrate various covers according to the invention which close the opening of the amplifier unit depending upon the type of module unit inserted therein.

When amplifier unit A is used in its basic format, a cover 42 (see FIG. 4A) can be attached to front surface 10a via conventional fasteners 43 to close opening 12 (shown by hidden lines in the figure). Thus, cover 42 can protect the basic electric circuit from exposure to dust or other elements. However, if a consumer changes vehicles (or sound chambers), another type of amplifier function may be desired so that the amplified sound matches the consumer's new sound chamber and the sound he desired. Until now, the consumer's only option was to purchase an entirely new amplifier unit and to replace the old unit with the newly purchased item. Thus, the consumer was left with an expensive item for which he has no use. Accordingly, changing amplifiers was a costly proposition.

OPTIONAL MODULE UNIT

According to the instant invention, cover 42 could be removed providing access to the basic electric circuitry mounted within housing 10 and, an optional module unit B could be inserted through opening 12 and into electrical connection with multiple contact connector 16 to provide additional functions to the basic amplifier unit A. As shown in the FIGS. 1–2 and 5, module unit B includes a smaller circuit board 50 on which the appropriate circuitry for a desired modification, such as a frequency network response change, can be mounted. The components of this additional circuitry, like the basic circuitry, can be electrically connected by leads printed on circuit board, as is conventional in the art.

At one end of module circuit board 50, a flange 52 of contact terminals 20 is disposed which can be inserted within multiple contact connector 16 to electrically connect the additional circuitry of module unit B with the basic electric circuit mounted on circuit board 26 of amplifier unit A. In one embodiment, multiple contact connector 16 may have 13 terminal contacts and flange 52 of module circuit board 50 can have up to 13 terminals depending upon the circuitry involved which when inserted match up to the appropriate terminal contacts of multiple contact connector 16.

A plurality of module units B can be manufactured where each module unit has different additional circuitry which corresponds to another operating characteristic for modulating or changing a received signal. For example, with these module units, any alternation can be made to a basic musical waveform (audio signal). The circuitry of these additional module units, as well as the basic electric circuitry, is omitted from the drawings and this disclosure as one of ordinary skill in the art would know how to produce such circuits.

Circuit board 50 of module unit B can include its own circuit adjustment controls 54, 56 which are in electrical communication with the additional circuitry mounted on circuit board 50. These module circuit adjustment controls 54, 56 are arranged on an end of circuit board 50 such that when contact terminals 20 are in electrical connection with multiple contact connector 16 and thus the basic electric circuit mounted on circuit board 26, these controls extend past front surface 10a housing 10. Accordingly, the entire circuit board 50 can be received within opening 12 so that the opening can be covered once a module is installed. Circuit adjustment controls may be knobs 54 associated with rheostats for changing frequency levels or a switch 56 which selects whether high (treble) or low (bass) frequencies are being fine tuned by the adjustment control 56. Accordingly, a consumer can further vary the degree of the modified operating characteristics by selectively operating the knobs or switches of controls 54, 56.

A modified cover or indicia plate 58 may include a number of openings through which module adjustment controls 54, 56 can pass through. This modified cover can then be secured to front surface 10a providing a protective cover over opening 12 and protecting the additional circuitry and basic electric circuitry from the elements. Indicia corresponding to the module unit can be marked on plates 58 showing what the varying controls can do.

Figure 4B:
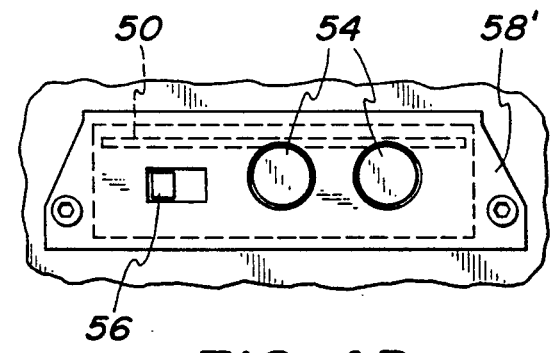
Figure 4C:
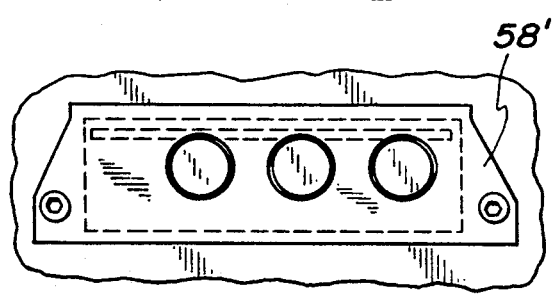
Figure 4D:
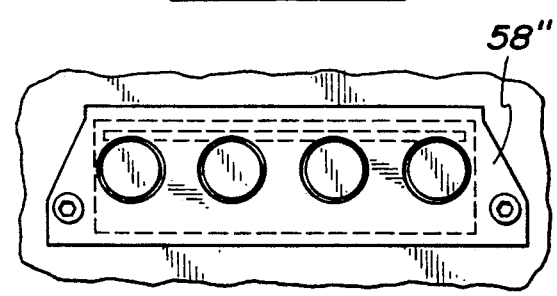

FIGS. 4B-4D show other examples of cover plates which correspond to other types of optional module units. These cover plates 58', 58'' include the appropriate openings through which extend control knobs 54 attached to the various module units and may include indicia which is printed about each associated adjustment control opening, for indicating the frequency level or band being modified when turning the associated control.

Figure 5:
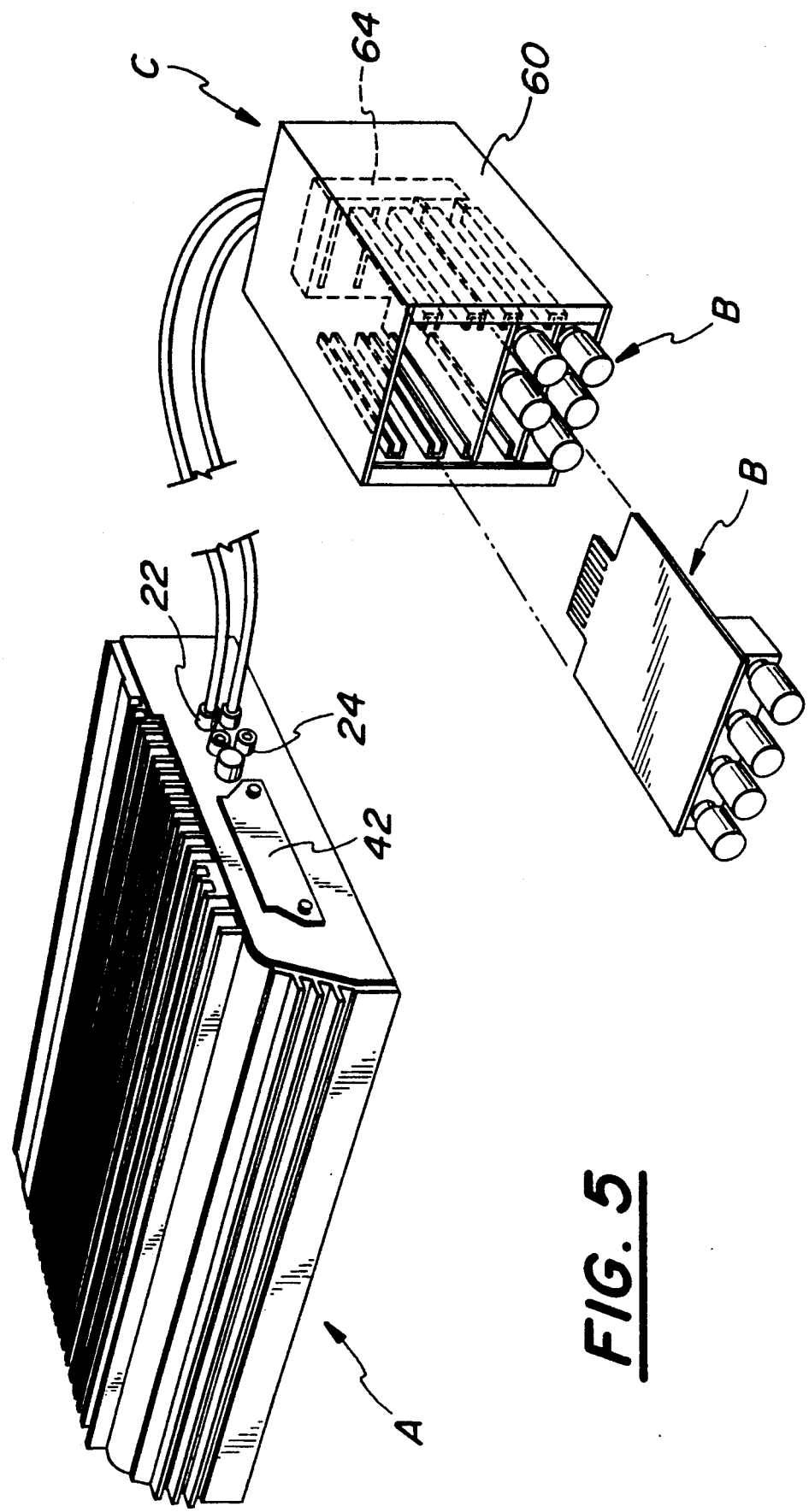
FIG. 5 is an exploded, perspective view of an amplifier unit and an external racking system according to the invention.

While the above-described amplifier system enables a consumer to take a basic 2 or 4 channel amplifier unit and inexpensively add a single special function by inserting one of the plurality of module units B, FIG. 5 illustrates an amplifier unit A according to the invention used in conjunction with an external racking system C which enables the use of two, three or more module units to be combined to create an amplifier unit with several functions. This external racking system C includes rack means 60 for receiving at least two module units B which have differing additional circuitry. Rack means 60 includes several guide members which may be mounted in parallel as shown in the figure which receive optional module units B and a multiple contact connector 64 which receives the electric terminals 20 of each individual module unit B and transfers the same to the basic electric circuit mounted on circuit board 26 of amplifier unit A. Multiple contact connector 64 is connected via cables 66, 68 to the appropriate sockets 22 mounted on front surface 10a. The audio signals output from a radio system can be inputted into the remaining sockets 24. Other circuit connections are possible as would be readily apparent to those skilled in the art.

While this invention has been described as having a preferred design, it is understood that it is capable of further modification, uses and/or adaptations of the invention following in general the principle of the invention and including such departures from the present disclosure as come with the known or customary practice in the art to which to invention pertains and as may be applied to the central features hereinbefore set forth, and fall within the scope of the invention and of the limits of the appended claims.

I claim:

1. An amplifier unit adapted for use in a vehicle having a sound system and for enhancing output signals of the sound system, said amplifier unit comprising:

a) a housing provided with an opening for accessing the interior of said housing, said opening being designed to receive module units therethrough;
   b) means for receiving a signal attached to said housing;
   c) circuitry means, forming an operable amplifier with basic operating characteristics, for amplifying the received signal, said circuitry means being mounted within said housing;
   d) connection means for optionally receiving module units having additional circuitry within said housing and for electrically connecting said additional circuitry with said circuitry means to modify the basic operating characteristics of the operable amplifier of said circuitry means;
   e) means for outputting the amplified signal; and
   f) said amplifier unit can output amplified signals without a module unit being connected to said circuitry means.

2. An amplifier unit according to claim 1, wherein:
   a) said connection means is disposed within said housing in alignment with said opening.

3. An amplifier unit according to claim 1, further comprising:
   a) means for automatically switching from the basic operating characteristics of said circuitry means to a modified operating characteristic by inserting a module unit through said opening and into electrical connection with said connection means.

4. An amplifier unit according to claim 1, wherein said connection means includes:
   a) guide means for guiding the insertion of optional module units received through said opening.

5. An amplifier unit according to claim 4, wherein:
   a) said connection means further includes a plurality of electrical terminals in communication with said circuitry means; and
   b) said guide means align terminal contacts of said additional circuitry with said plurality of electrical terminals to assure proper electrical connection of said module unit with said circuitry means.

6. An amplifier unit according to claim 5, wherein:
   a) said guide means are disposed within said housing adjacent said opening.

7. An amplifier unit according to claim 6, wherein:
   a) said housing includes top and bottom surfaces, two side surfaces and front and back faces; and
   b) said opening is formed in said front face and is oriented to receive a module unit substantially parallel to said top and bottom surfaces.

8. An amplifier unit according to claim 1, further comprising:
   a) cover plate means for temporarily closing said opening of said housing.

9. An amplifier unit according to claim 8, wherein:
   a) said connection means includes a plurality of electrical terminals in electrical communication with said circuitry means, said electrical terminals being designed for electrical connection with additional circuitry of module units; and
   b) said cover plate means indicates which, if any, of the plurality of module units are connected to said circuitry means.

10. An amplifier kit comprising:
    a) an amplifier unit having i) a housing provided with an opening for accessing the interior of said housing, said opening being designed to receive module units therethrough,
ii) means for receiving a signal attached to said housing,
iii) circuitry means, forming an operable amplifier with basic operating characteristics, for amplifying the received signal, said circuitry means being mounted within said housing,
iv) connection means for optionally receiving module units having additional circuitry within said housing and electrically connecting said additional circuitry with said circuitry means to modify the basic operating characteristics of the operable amplifier of said circuitry means, and
v) means for outputting the amplified signal;
b) a plurality of module units, each having differing additional circuitry corresponding to a desired operating characteristic for modulating the received signal and terminal means for electrical connection with said connection means of said amplifier unit;
c) means for automatically switching from said operable amplifier having basic operating characteristics to a modified amplifier with modified operating characteristics by inserting one of said plurality of module units through said opening and in electrical communication with said connection means; and
d) said amplifier unit can output amplified signals without a module unit being connected to said circuitry means.

11. An amplifier kit according to claim 10, further comprising:
   a) cover plate means for temporarily closing said opening of said housing.
12. An amplifier kit according to claim 11, wherein:
   a) said cover plate means include a plurality of indicia plates, each indicia plate corresponding to one of said module units and covering said opening when its respective module unit is inserted; and
   b) a cover plate for covering said opening, when said amplifier unit is operated without a module unit.
13. An amplifier kit according to claim 12, wherein:
   a) said module units each have individual control knobs; and
   b) said indicia plates have control openings through which controls knobs attached to said module units extend.
14. An amplifier kit according to claim 10, further comprising:
   a) an external racking system including
      i) rack means for receiving at least two module units having differing additional circuitry and for electrically connecting the at least two received module units, and
      ii) means for electrically connecting said rack means with said circuitry means.
15. An amplifier kit according to claim 14, wherein:
   a) said electrical connecting means of said racking system includes cables for connection with output sockets of said amplifier unit.
16. An amplifier kit according to claim 15, wherein:
   a) said at least two module units are received substantially in parallel in said rack means.

* * * * *